United States Patent
Fleming et al.

(10) Patent No.: US 8,678,424 B2
(45) Date of Patent: Mar. 25, 2014

(54) BICYCLE TRAILOR FRONT WHEEL ARRANGEMENT

(71) Applicant: Thule Child Transport Systems Ltd, Calgary (CA)

(72) Inventors: Wesley Justin Fleming, Calgary (CA); Matthew Stengler, Calgary (CA); Daniel W. Britton, Calgary (CA); Garner Elliot Meszaros, Langdon (CA); Roberto Berritta, Fiesso DArtico (VE); Martin John Behling, II, Allenton, WI (US); David Anderson, Calgary (CA)

(73) Assignee: Thule Child Transport Systems Ltd., Alberta (CA)

( * ) Notice: Subject to any disclaimer, the term of this patent is extended or adjusted under 35 U.S.C. 154(b) by 0 days.

(21) Appl. No.: 13/629,158

(22) Filed: Sep. 27, 2012

(65) Prior Publication Data
US 2014/0015222 A1    Jan. 16, 2014

(30) Foreign Application Priority Data

Jul. 13, 2012   (EP) .................................... 12176346

(51) Int. Cl.
B62B 5/00   (2006.01)
(52) U.S. Cl.
USPC ........... 280/646; 280/642; 280/644; 280/647; 280/648
(58) Field of Classification Search
USPC .......................... 280/646, 642, 644, 647, 648
See application file for complete search history.

(56) References Cited

U.S. PATENT DOCUMENTS

| 3,271,048 | A | | 9/1966 | Beesley et al. |
| 4,028,773 | A | * | 6/1977 | Morgan ........................ 16/35 R |
| 5,267,744 | A | | 12/1993 | Berry et al. |
| 5,344,171 | A | | 9/1994 | Garforth-Bles |
| 5,474,316 | A | | 12/1995 | Britton |
| D375,706 | S | | 11/1996 | Haung |
| 5,577,746 | A | | 11/1996 | Britton |
| 5,799,756 | A | | 9/1998 | Robert et al. |
| 6,368,006 | B1 | | 4/2002 | Yang et al. |
| 6,402,166 | B1 | * | 6/2002 | Chiu .......................... 280/47.38 |
| 6,435,622 | B1 | | 8/2002 | Kanehisa et al. |
| 6,634,665 | B2 | | 10/2003 | Hargroder |
| 6,863,297 | B2 | | 3/2005 | Shapiro |
| 7,011,321 | B2 | | 3/2006 | Hargroder |
| D633,825 | S | | 3/2011 | van Leeuwen et al. |

(Continued)

FOREIGN PATENT DOCUMENTS

| CN | 201350918 | 11/2009 |
| DE | 19832259 | 1/2000 |

(Continued)

OTHER PUBLICATIONS

U.S. Appl. No. 13/629,150, filed Sep. 27, 2012, Fleming et al.

(Continued)

*Primary Examiner* — Joseph M Rocca
*Assistant Examiner* — Marlon Arce
(74) *Attorney, Agent, or Firm* — Sheridan Ross P.C.

(57) ABSTRACT

A front wheel arrangement on a bicycle trailer is provided. The connecting hook is arranged to be rotated on the connecting axis that comprises a locking arrangement for locking the front wheel in an in-use position and in a rest position.

11 Claims, 7 Drawing Sheets

(56) References Cited

U.S. PATENT DOCUMENTS

| | | |
|---|---|---|
| 2008/0143076 A1 | 6/2008 | Klevana et al. |
| 2010/0244405 A1 | 9/2010 | Assaf |
| 2011/0316258 A1* | 12/2011 | Lin .............................. 280/651 |
| 2012/0086189 A1* | 4/2012 | Wu .............................. 280/651 |
| 2012/0200052 A1 | 8/2012 | Shapiro |

FOREIGN PATENT DOCUMENTS

| | | |
|---|---|---|
| DE | 102010010966 | 9/2011 |
| EP | 0913312 | 5/1999 |
| EP | 1162134 | 12/2001 |
| EP | 2017158 | 1/2009 |
| NL | 1018648 | 2/2003 |
| WO | WO 98/47753 | 10/1998 |

OTHER PUBLICATIONS

U.S. Appl. No. 13/629,143, filed Sep. 27, 2012, Britton et al.
U.S. Appl. No. 29/440,568, filed Dec. 21, 2012, Britton et al.
Extended European Search Report for European Patent Application No. 12176350.2 dated Jan. 24, 2013, 6 pages.

* cited by examiner

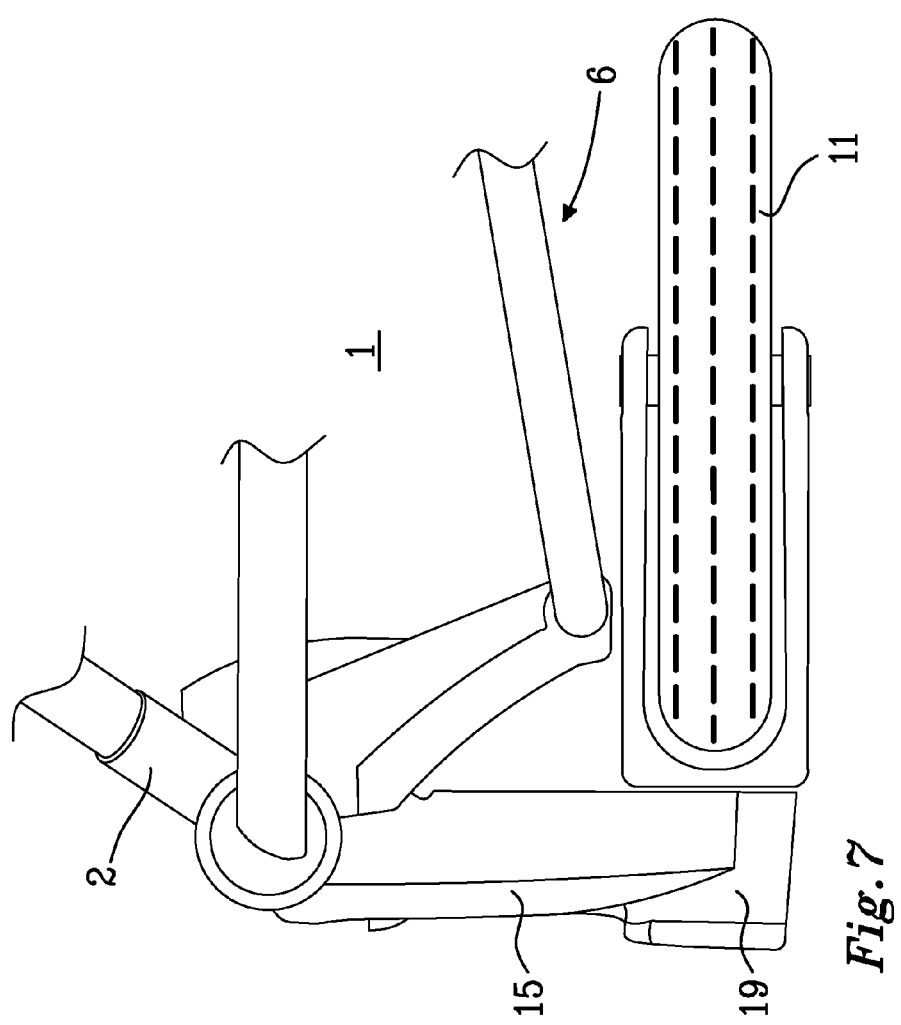

BICYCLE TRAILOR FRONT WHEEL ARRANGEMENT

CROSS REFERENCE TO RELATED APPLICATIONS

This application claims the benefit of European Patent Application No. 12176346.0, filed Jul. 13, 2012, the entire disclosure of which is incorporated by reference herein.

TECHNICAL FIELD

The invention pertains to a wheel arrangement on a bicycle trailer, the bicycle trailer comprising a trailer frame comprising a front wheel pivotably attached to a frame connecting member.

BACKGROUND

Bicycle trailers adapted to be coupled to the rear of a bicycle and to be pulled after the bicycle, are commonly equipped to be used both as bicycle trailers and as manually pushed carriers such as infant strollers. A combined stroller and bicycle trailer is described in DE 102030030966 A1. Other examples of convertible bicycle trailers are found in EP1162134 A1 and U.S. Pat. No. 5,267,744 A.

In order to be useful e.g. as an infant stroller, the trailer chassis is commonly provided with an additional wheel placed at the front of the bicycle trailer. The additional wheel is only needed when the bicycle trailer is used as a stroller or manually pushed cart. When the bicycle trailer is used in the trailer mode and is coupled to a bicycle, the small additional front wheel is not needed and is generally not even wanted as it is unsuitable for the speeds attained when the trailer is pulled after the bicycle. Furthermore, if the wheel is hanging down from the frame when the carrier is coupled to a bicycle the wheel may be hit by stones and other items on the ground over which the carrier is pulled.

Accordingly, it has been suggested that the additional front wheel be detachable so that it can be removed when the bicycle trailer is used in the trailer mode. In DE 102030030966 A1 it is disclosed to have an attachment member in the trailer frame that is adapted to receive a corresponding attachment member on the front wheel. The attachment members have a non-circular cross-section, such as a square cross-section allowing the front wheel attachment member to be plugged into the frame attachment member in two different and distinct positions wherein one position is an in-use, active position and the other position is a rest position that can be used when the bicycle trailer is being pulled after a bicycle.

The trolley disclosed in EP1162134 A1 has a front wheel that can be swung back into a rest position under the trolley. The front wheel arrangement in U.S. Pat. No. 5,267,744 A can be rotated to the rear in an upwards rest position and can be locked in position by tightening a threaded knob.

Although the prior art front wheel arrangements allow the front wheel to be moved into a rest position, they are still not completely satisfactory.

An object of the invention is therefore to offer a front wheel arrangement allowing a user the possibility of choosing whether to completely remove the front wheel from the trailer frame or to leave it in a rest position on the bicycle trailer when the bicycle trailer is used in the trailer mode.

A further object of the invention is to simplify the conversion of a bicycle trailer between a trailer mode and a push-carrier mode.

SUMMARY OF THE INVENTION

In accordance with the invention there is offered a wheel arrangement on a bicycle trailer comprising a trailer frame and having a longitudinal direction constituting a travelling direction of the bicycle trailer and a transverse direction perpendicular to the longitudinal direction. The wheel arrangement is a front wheel arrangement comprising a front wheel pivotably attached to a frame connecting member. The trailer frame comprises a connecting axis arranged in the transverse direction of the bicycle trailer and the frame connecting member comprises a connecting hook arranged to engage with the connecting axis. The connecting hook has a width in the transverse direction of the bicycle trailer and is configured fit on the connecting axis and to receive the connecting axis in an elongated receiving cavity extending in the transverse direction over the full width of the connecting hook and comprising an elongated opening extending in the transverse direction over the full width of the connecting hook and being sized and configured to permit the connecting axis to be inserted into the receiving cavity and to be removed from the receiving cavity through the opening. The connecting hook is arranged to be rotated on the connecting axis between an in-use position, a rest position, and a release position and the wheel arrangement comprises a locking arrangement for locking the front wheel in the in-use position and in the storage position.

The front wheel arrangement of the invention allows the connecting member and the appended front wheel to be moved between the in-use position, the rest position and the release position by simply rotating the connecting member on the connecting axis. When the front wheel is in the in-use position it can be used to support the bicycle trailer in the push-carrier mode. When the front wheel is in the rest position it is lifted up, preferably towards the rear of the bicycle trailer so that it is out of contact with the ground when the bicycle trailer is used in the trailer mode. When the front wheel is in the release position, the connecting member with the front wheel attached thereto can be detached from the connecting axis and can be completely removed from the bicycle trailer.

In order to provide the connection between the bicycle trailer frame and the front wheel with high torsional resistance in a transverse direction of the bicycle trailer, the width of the connecting hook is preferably greater than a diameter of the connecting axis.

The front wheel is preferably arranged so that it is folded in under the trailer frame when the connecting hook is rotated into the storage position. It may also be preferred that the front wheel is rotated sideways at 90° to the travel direction before being moved into the storage position so that it can be brought to rest generally horizontally beneath the trailer frame. It may further be preferred that the pivoting wheel attachment is provided with locking means for locking the front wheel on the connecting member in a position perpendicular to the travelling direction of the bicycle trailer. Such locking means may be any type of locking means suitable for the purpose, such as the locking mechanism described in CN201350918 which comprises a spring-loaded locking pin which is arranged to engage with corresponding locking holes or cavities placed in a locking plate.

By locking the wheel in the sideways rotated position, it is ascertained that the wheel will stay secured in the horizontal position when the bicycle trailer is used in the trailer mode so that it will not flip down towards the ground or rattle against the trailer frame.

Alternatively, the wheel may simply be held in the rest position close to or in contact with the underside of the trailer so that rotation of the wheel is physically hindered by the trailer frame. This may be a less preferred option, as the wheel may vibrate and rattle against the trailer frame resulting in unwanted noise.

The connecting axis may be arranged in a holder that may be mounted on a cross bar at the front of the trailer frame. The holder may comprise first and second locking elements arranged to engage with a corresponding locking element arranged on the connecting hook when the connecting hook is brought into the in-use position and into the rest position, respectively.

The locking elements on the holder may preferably be female locking elements and the locking element on the connecting hook may comprise a male locking element arranged to engage with the first female locking element when the locking member is brought into the in-use position and to engage with the second female locking element when the locking member is brought into the rest position. The male locking element may be a plug or a pin, or similar element protruding from the wall of the receiving cavity in the connecting hook and the female locking elements may be cavities or holes in a holder wall. The locking elements may be of the type snapping into interlocking engagement, for instance by the means of the male locking element on the connecting hook being provided with a spring-loading mechanism.

The locking arrangement may be connected to a manually operated release member. The release member is preferably arranged to act on the locking element on the connecting hook to release the locking element from a locking element in the holder. By arranging a release member acting on the single locking element on the connecting hook, it is possible to release the engagement between the hook locking element and any one of the two locking elements on the holder with the same release member.

When the locking arrangement comprises a spring-loaded male locking element arranged on the connecting hook, the release member may comprise a lever acting on a spring mechanism in the spring-loaded male locking element. By maneuvering the release member, the male locking element can be lifted out of the corresponding female locking element thus releasing the connecting hook from the connecting axis and allowing rotational movement between the connecting hook and the connecting axis.

The release member may be a push-button, or a finger lift that is connected to the locking element on the connecting hook. A finger lift may be preferred as it can be arranged generally flush with a surface on the connecting member and be protected against inadvertent activation.

The wheel arrangement according to the invention may comprise a guiding arrangement comprising a guiding member, the guiding member being arranged to restrict rotation of the frame connecting member on the connecting axis.

The wheel arrangement may further comprise a guiding track arranged in the housing for the connecting axis and a corresponding guiding pin arranged on the frame connecting member. The guiding member preferably defines a maximum upwards rotation of the frame connecting member on the connecting axis, wherein the maximum upwards rotation of the frame connecting member corresponds to the release position of the frame connecting member.

The invention also offers a front wheel arrangement on a bicycle trailer, the bicycle trailer comprising a trailer frame and having a longitudinal direction constituting a travelling direction of the bicycle trailer and a transverse direction perpendicular to the longitudinal direction. The wheel arrangement comprises a front wheel pivotably attached to a frame connecting member and means for locking the front wheel in a position perpendicular to the travelling direction.

DEFINITIONS

By a horizontal direction as used herein is implied a direction in a horizontal plane of a bicycle trailer when in an in-use-position, i.e. while being pulled after a bicycle or being pushed by a person.

By a vertical direction as used herein is implied a direction in a vertical plane through a bicycle trailer when in an in-use-position, i.e. while being pulled after a bicycle or being pushed by a person.

By a front part of a bicycle trailer as used herein is implied a part that is intended to be facing forward in the travelling direction, either towards a bicycle if the bicycle trailer is coupled to a bicycle or to be facing away from a pusher of the bicycle trailer when it is used as a push carrier.

A back or rear part of a bicycle trailer is a part opposite to the front part and intended to be facing away from a bicycle or towards a person depending on how the bicycle trailer is being used.

A travelling direction of a bicycle trailer is a direction in which the bicycle trailer is designed to be moved. The travelling direction corresponds to a longitudinal direction of the bicycle trailer, and is perpendicular to a transverse direction of the bicycle trailer.

Positional terms such as "upper", "lower", "underside", etc. when used herein to describe the location of an element should be understood as referring to a bicycle trailer when in a position for use as a trailer or a push-carrier. Positional terms are used in a corresponding way to describe the relative positioning of elements in a bicycle trailer in an in-use position.

BRIEF DESCRIPTION OF THE DRAWINGS

The invention will be described in greater detail with reference to the appended drawings in which:

FIG. 7 shows a side view of a front wheel arrangement according to the invention in a rest position.

DETAILED DESCRIPTION

Figure 1:
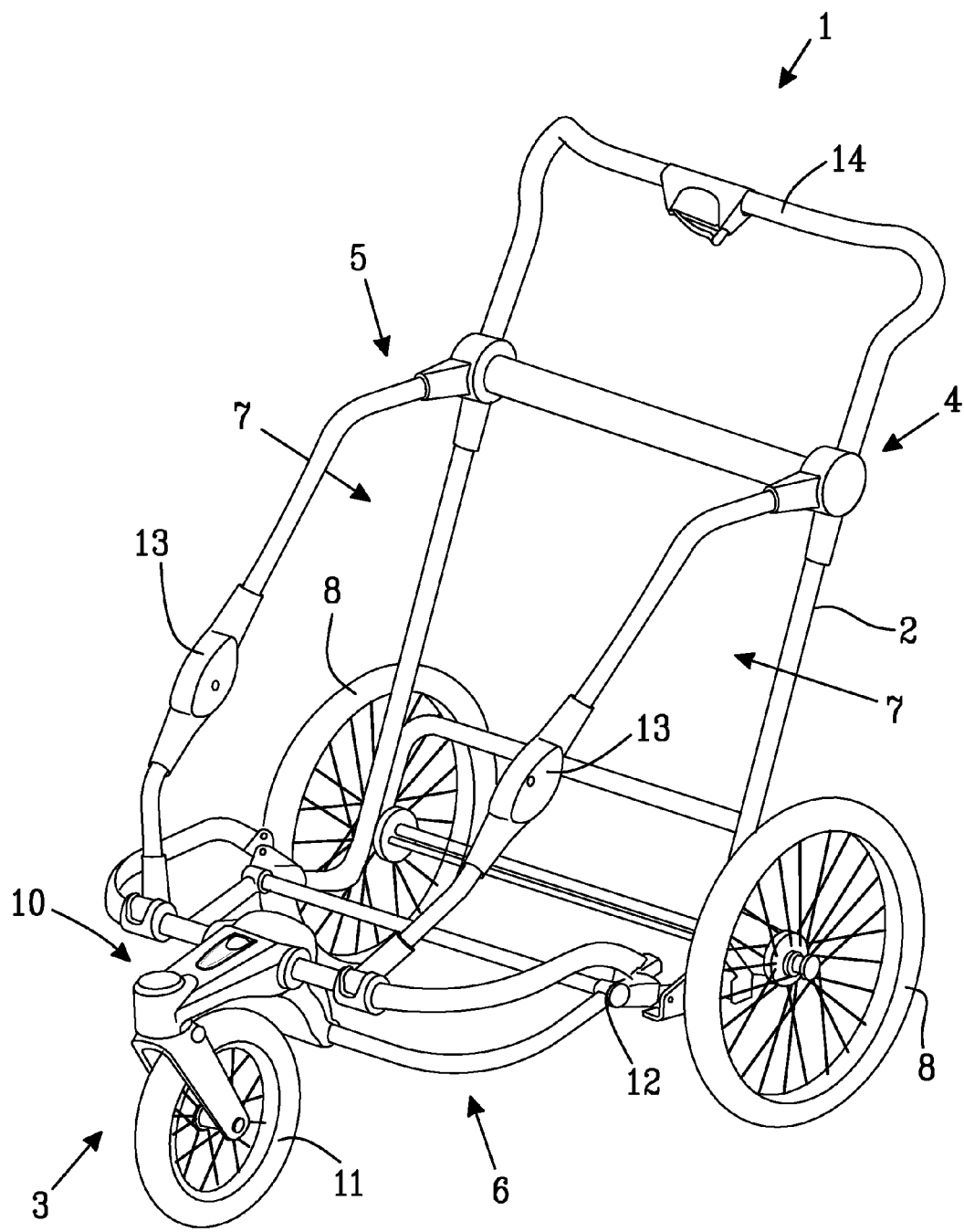
FIG. 1 shows a perspective view of a bicycle trailer without any covering and with a front wheel arrangement according to the invention.

The bicycle trailer 1 in FIG. 1 is shown without any covering, revealing the structure of the trailer frame 2. The bicycle trailer 1 has a front end 3, a rear end 4, a top 5, a bottom 6 and two sides 7 as seen in FIG. 1. The bicycle trailer 1 is a dual function bicycle trailer that can be used in a trailer mode, coupled to the rear end of a bicycle and in a stroller mode allowing the carrier to be pushed by a walking or running person. The bicycle trailer 1 in FIG. 1 is shown in the stroller mode, i.e. without any connection to a bicycle. Apart from the trailer frame 2 and the covering that is absent in FIG. 1, the bicycle trailer 1 comprises two rear wheels 8 mounted on a horizontal rear axis 9 and a front wheel arrangement 10 with a front wheel 11 pivotably mounted at the front end 3 of the bicycle trailer 1. When the bicycle trailer 1 is in the trailer mode, it can be coupled to the rear end of a bicycle by means of a coupling device 12 arranged at the front end 3 of the bicycle trailer 1.

The bicycle trailer 1 in FIG. 1 is of the type that can be folded into a compact transport and storage configuration by folding the trailer frame 2 at lockable joints 13. Foldability is generally a desired feature of a bicycle trailer but is not an essential feature of the bicycle trailer 1 according to the invention.

The bicycle trailer frame 2 further comprises a handle bar 14 at the rear end 4 of the trailer frame 2 allowing the bicycle trailer to be pushed by a walking or running person when the bicycle trailer is in the stroller mode.

Figure 2:
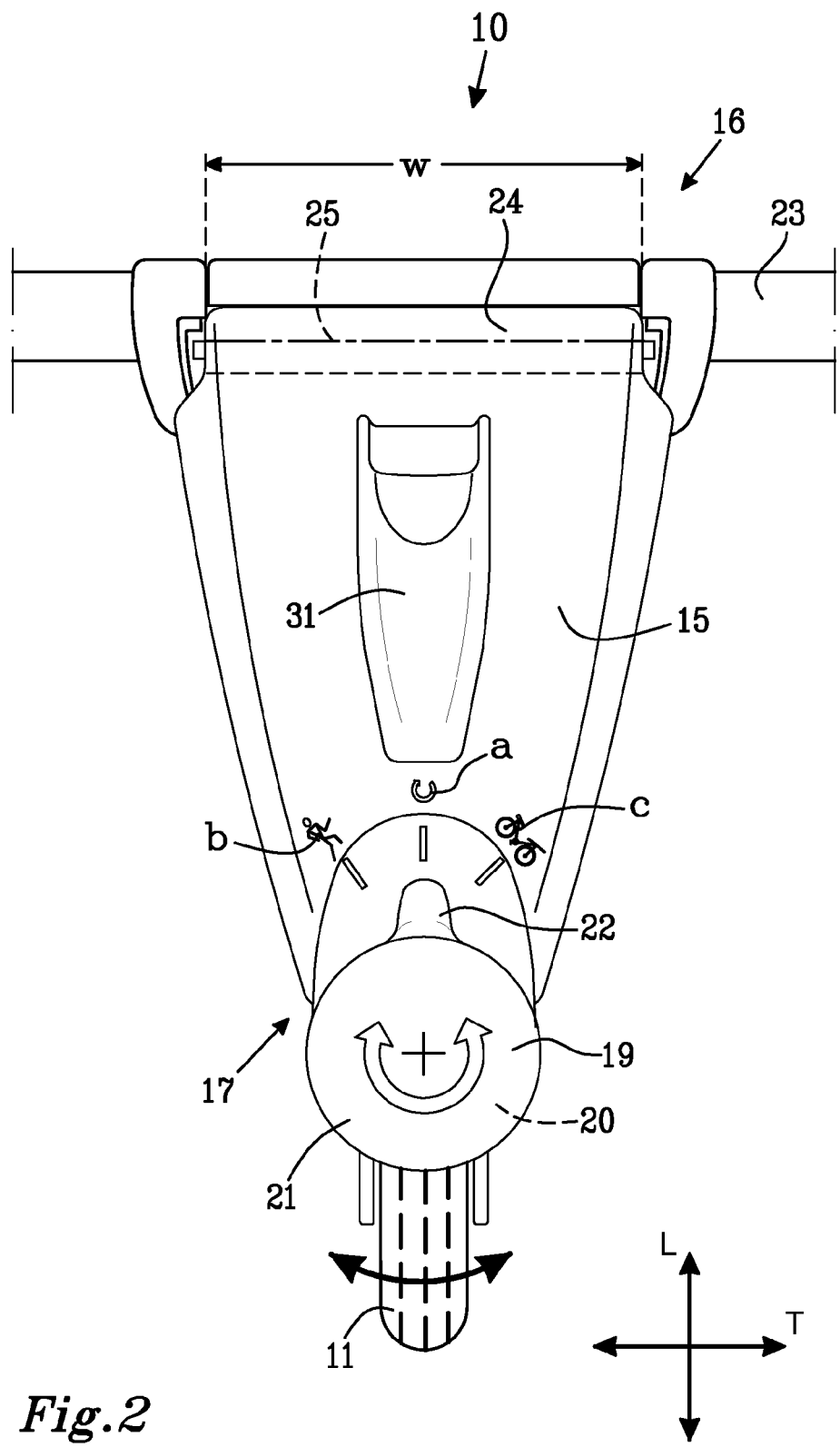
FIG. 2 shows the front wheel arrangement on the bicycle trailer in FIG. 1 from above and with the front wheel in a first position.
Figure 3:
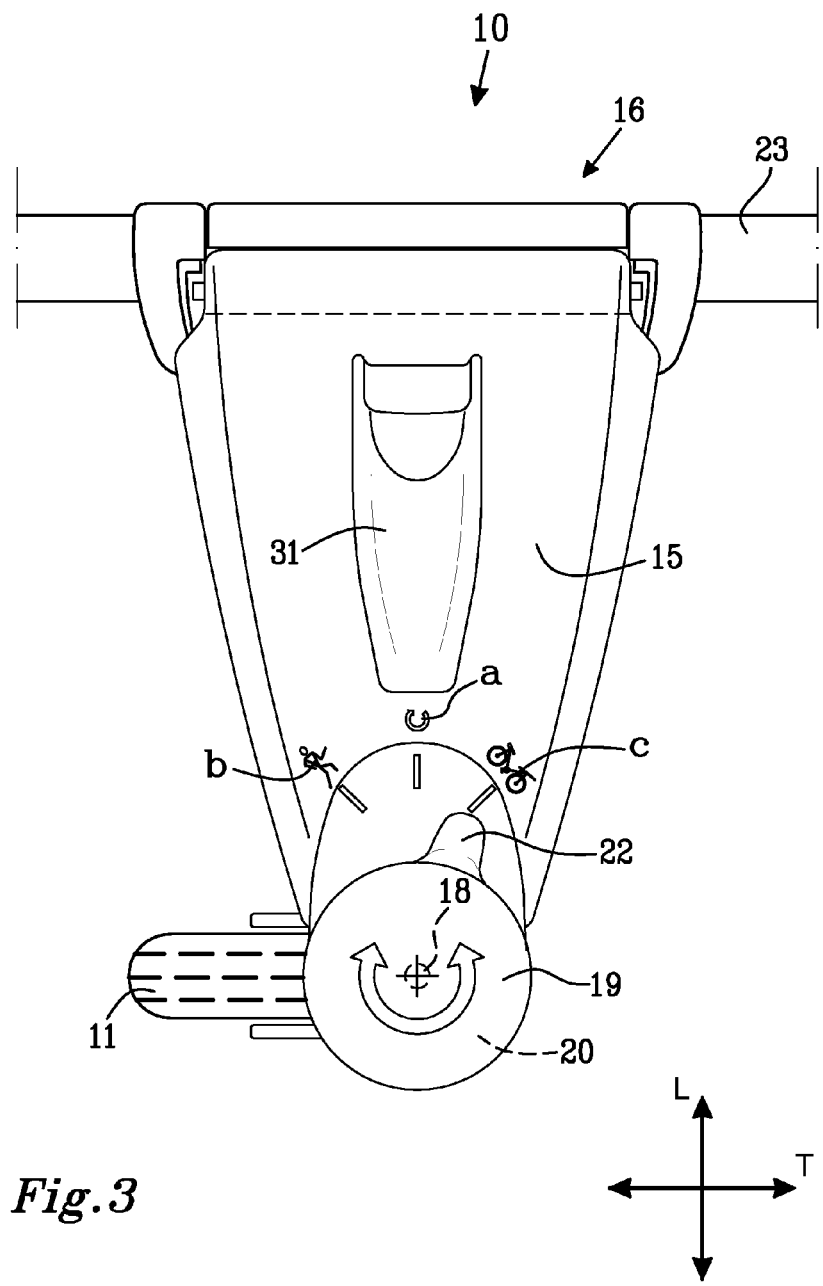
FIG. 3 shows the front wheel arrangement on the bicycle trailer in FIG. 1 from above and with the front wheel in a second position.

FIGS. 2 and 3 show the front wheel arrangement 10 on the bicycle trailer 1 in FIG. 1 from above. The front wheel arrangement 10 comprises a frame connecting member 15 with a first, inner end 16, which is connected to the trailer frame 2 and a second, outer end 17, at which the wheel 11 is pivotably attached on a pivot axle 18 arranged in a wheel hub 19.

The upper surface of the connecting member 15 is shown with a substantially triangular shape with the inner end 16 being wider than the outer end 17.

A front wheel locking mechanism 20 is provided in the wheel hub 19, allowing adjustment of the wheel attachment depending on the intended use of the bicycle trailer. The wheel locking mechanism 20 is operated by means of a turn knob 21 having an indicator pin 22 which can be set in three different and distinct positions a, b and c indicated by symbols on the frame connecting member 15. The turn knob 21 acts on the wheel locking mechanism 20 and shifts the locking mechanism 20 between a first position, a, which may be suitable when the bicycle trailer 1 is used in the stroller mode by a walking person, a second position, b, which may be suitable when the bicycle trailer 1 is used in the stroller mode by a running person and a third position, c, which may be suitable when the bicycle trailer 1 is used in the trailer mode or when it is folded together for transport or storage.

The wheel locking mechanism 20 in the wheel hub 19 may be any suitable wheel locking mechanism 20 as known in the art, such as a wheel locking mechanism 20 comprising a spring-loaded locking pin being arranged to engage with corresponding locking holes or cavities placed at appropriate locations in a locking plate or other receiving member. An example of a locking arrangement of this kind is disclosed in CN201350918.

When the wheel locking mechanism 20 is set to the first position, a, the wheel 11 is in a free-wheel position allowing full rotation of the wheel around the pivot axle 18 and making the bicycle trailer 1 easy to steer. When the wheel locking mechanism 20 is set to the second position, b, the wheel 11 is locked in a position parallel to the longitudinal direction, L, of the bicycle trailer 1 as shown in FIG. 1 and cannot rotate around the pivot axle 18, making the bicycle trailer 1 travel straight forward or rearward without inadvertently turning or wobbling when pushed or pulled by a running person. When the wheel locking mechanism 20 is set to the third position, c, the wheel 11 is locked in a position parallel to the transverse direction, T, of the bicycle trailer 1 as shown in FIG. 3 and cannot rotate around the pivot axle 18. The third position is selected when the bicycle trailer 1 is to be used in the trailer mode, as will be described herein. The third position may also be used as a braking position, when parking the bicycle trailer 1 as the bicycle trailer can only rotate on the spot without moving forwards or backwards when the front wheel is locked in a transverse position. The third position may further be used simply to shorten the bicycle trailer, for instance when parking or storing it in a limited space.

Although highly preferred, the front wheel locking mechanism 20 is an optional feature of the invention. Furthermore, a wheel locking mechanism may have only two locking positions, corresponding to the first and third positions described above.

The frame connecting member 15 is connected to a front cross bar 23 on the trailer frame 2 at the inner end 16 of the frame connecting member 15. The connection is made by means of the frame connecting member 15 having a connecting hook 24 that is hooked over a connecting axis 25 arranged on the front cross bar 23 and extending in the transverse direction, T.

As shown in FIG. 2, the connecting hook 24 may have a width, w, in the transverse direction, T, of the bicycle trailer 1 which is greater than a diameter of the connecting axis 25.

Figure 4:
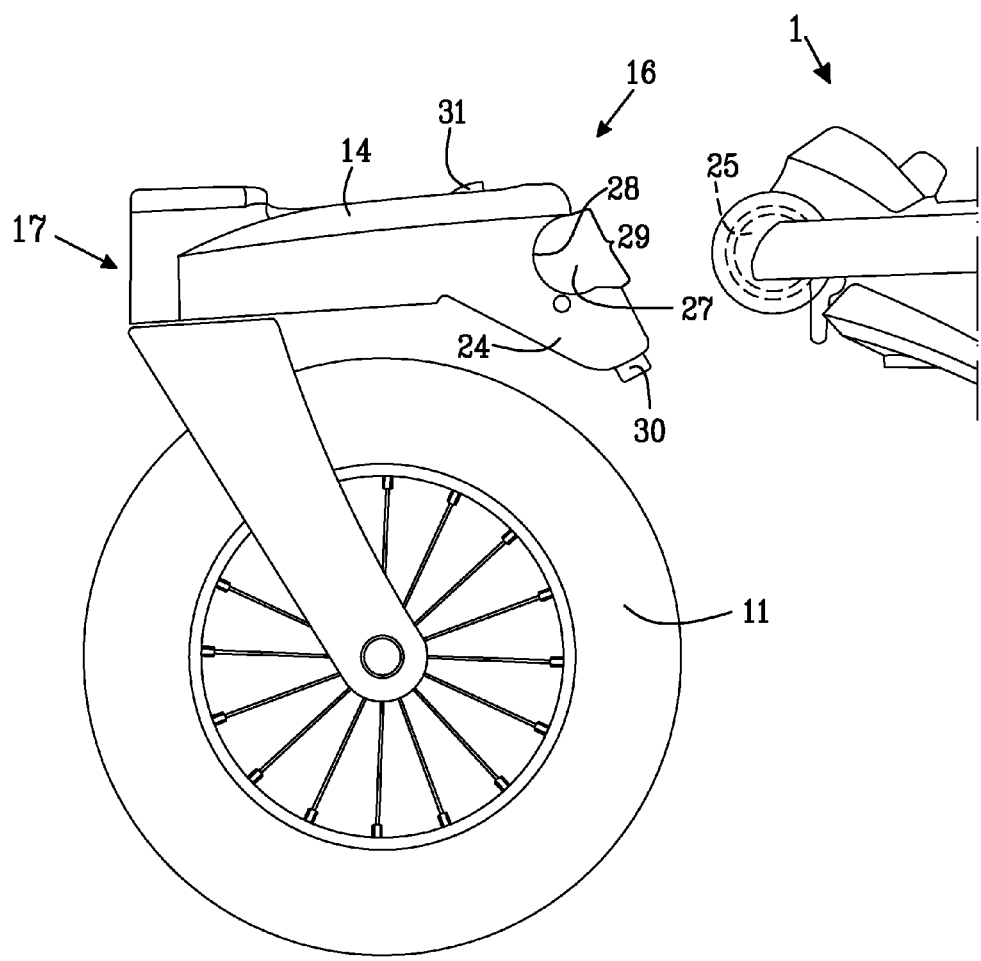
FIG. 4 shows a side view of a frame connecting member with an appended front wheel.

With reference to FIG. 4, there is shown a side view of the frame connecting member 15 which has been decoupled from the bicycle trailer 1. The frame connecting member 15 has a front wheel 11 attached at the outer end 17 and a connecting hook 24 at the inner end 16. The connecting hook 24 is configured fit on the connecting axis 25 and to receive the connecting axis 25 in an elongated receiving cavity 27 extending in the transverse direction, T over the full width of the connecting hook 24. The receiving cavity 27 has a curved inner wall 28 adapted to the curvature of the connecting axis 25 and the mouth of the connecting hook 24 forms an elongated opening 29 extending in the transverse direction, T, over the full width, w, of the connecting hook 24. The elongated opening 29 has a size adapted to the size of the connecting axis 25, allowing the connecting axis 25 to be inserted into the receiving cavity 27 and to be removed from the receiving cavity 27 through the opening 29.

Figure 5:
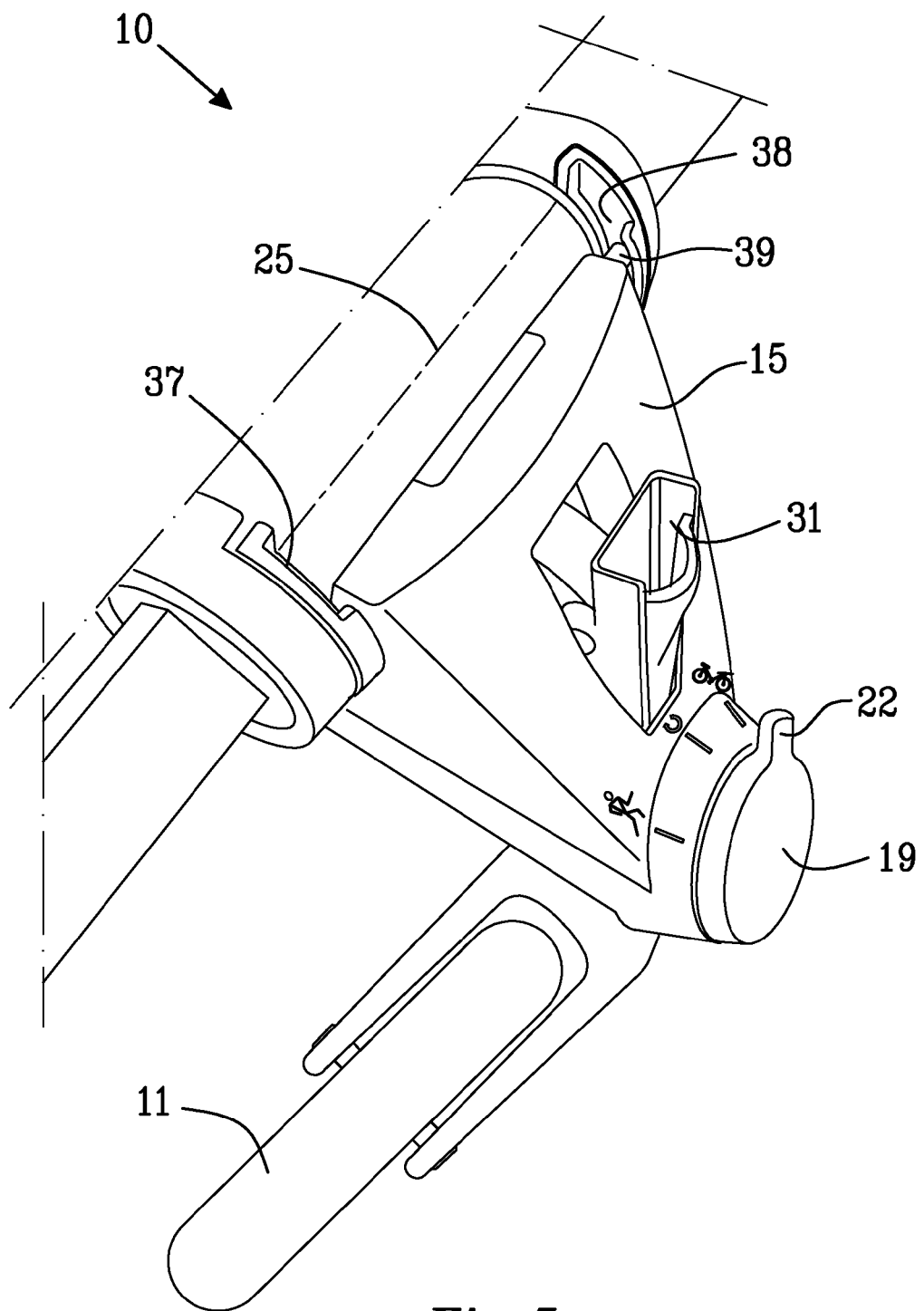
FIG. 5 shows a perspective view of the front wheel arrangement on the bicycle trailer in FIG. 1.

The connecting hook 24 has a male fastener element in the form of a locking pin 30 that is movable between a locking position as shown in FIG. 4 with the locking pin 30 protruding out from the connecting hook 24 on the underside of the frame connecting member 15 and a release position wherein the locking pin 30 is retracted into the interior of the connecting hook 24. The locking pin 30 can be moved from the locking position to the release position by lifting a release handle 31 which is connected to the locking pin 30 via a system of levers acting to retract the locking pin 30 into the connecting hook 24. FIG. 5 shows the frame connecting member 15 in a downwardly folded position and with the handle 31 lifted up from the surface of the frame connecting member 15.

The locking pin 30 is preferably provided with a spring mechanism, exerting a spring-back force on the locking pin 30. When there is sufficient expansion room on the outside of the connecting hook 24, the spring-loaded locking pin 30 will automatically spring back into the locking position when the release handle 31 is in the rest position, flush with the upper surface of the connecting member 15, as shown in FIGS. 2-4.

The connecting hook 24 is arranged to be rotated on the connecting axis 25 between a horizontal in-use position, which is the position shown in FIGS. 2 and 3, a downwardly rotated rest position as shown in FIG. 7, and a release position with the frame connecting member 15 being rotated to a slightly upwards position, at an angle to the horizontal position which is shown in FIG. 2. The release position is shown in cross-section in FIG. 6.

Figure 6:
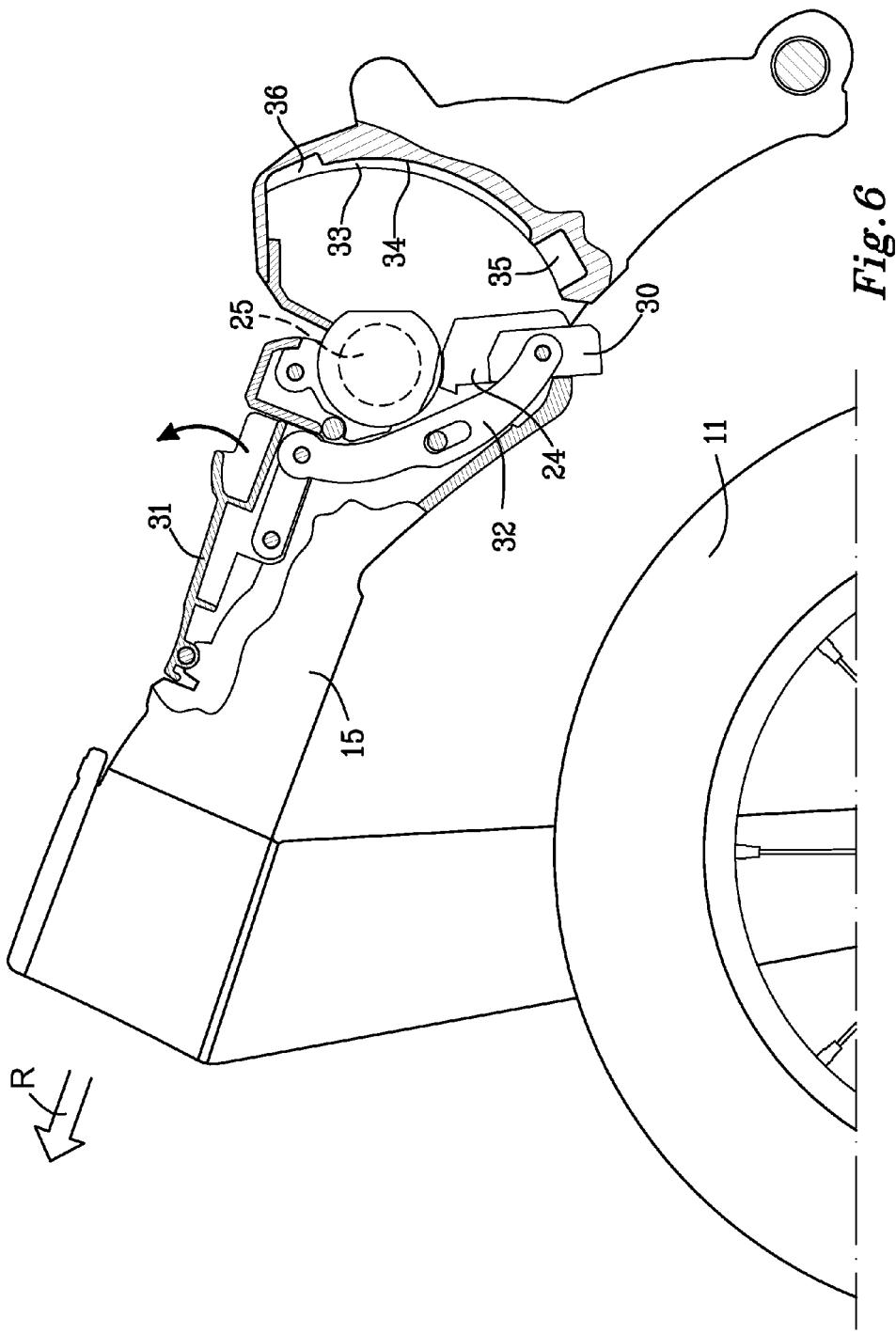
FIG. 6 shows a cross-sectional view of a front wheel arrangement according to the invention.

With further reference to FIG. 6, the frame connecting member 15 is shown to be attached to the connecting axis 25 by means of the connecting axis 25 being inserted into the inner cavity 27 of the connecting hook 24 through the elongated opening 29 in the connecting hook 24. In the position shown in FIG. 6, the frame connecting member 15 is not locked on the connecting axis 25, but can be easily removed by simply pulling or lifting the frame connecting member 15 together with the attached front wheel 11 out of engagement with the connecting axis 25 in a removal direction, R, as indicated in FIG. 6.

FIG. 6 shows a schematic representation of a lever mechanism 32 inside the frame connecting member 15. The lever mechanism 32 is arranged to act on the locking pin 30 and enables the locking pin to be retracted into the connecting hook 24 when the release handle 31 is lifted as shown in FIG. 5.

The connecting axis 25 is arranged in a holder 33 placed at the rear of the connecting axis 25 and comprising a locking wall 34 in which is arranged a first and a second female locking element in the form of a first locking cavity 35 placed in the lower part of the locking wall 34 and a second locking cavity 36 placed in the upper part of the locking wall 34. The first locking cavity 35 and the second locking cavity 36 each have a shape corresponding to the shape of the locking pin 30 and are arranged to interact with the locking pin 30 to lock the frame connecting member 15 on the connecting axis 25 in an in-use position and a rest position, respectively.

The front wheel arrangement 10 of the invention can be transferred between the in-use position and the rest position by pulling at the release handle 30 causing the locking pin 30 to be retracted into the connecting hook 24, unlocking the frame connecting member 15 from the connecting axis 25 and allowing the frame connecting member 15 to be rotated on the connecting axis 25. The first locking position is attained by rotating the frame connecting member 15 to a generally horizontal position in which the locking pin 30 can spring back into the first locking cavity 35 in the lower part of the locking wall 34 and the second locking position is attained by rotating the frame connecting member 15 to a generally vertical position in which the locking pin 30 can spring back into the second locking cavity 36 in the upper part of the locking wall 34.

When the front wheel arrangement 10 is to be converted from the in-use position to the rest position, the front wheel 11 is first turned in the transverse direction, as shown in FIG. 3 and is preferably locked in the transverse direction by setting the turn knob 22 in the third position, c, indicated by the bicycle symbol. The release handle 31 is then lifted, causing the locking pin 30 to be retracted from the first locking cavity 35 in the lower part of the locking wall 34 and allowing the frame connecting member 15 to be rotated on the connecting axis 25. By rotating the frame connecting member 15 downwards, the locking pin 30 is moved along the locking wall 34 in the holder 33 until it reaches the second locking cavity 36 in the upper part of the locking wall and can snap into locking engagement with the locking hole. In this position, the front wheel 11 is folded in under the trailer frame 2, where it is secured out of the way and at a distance from the ground when the bicycle trailer 1 is to be used in the trailer mode. The rest position may also be useful when folding the bicycle trailer 1 into a compact configuration for transport and storage.

As best shown in FIG. 5, the rotational movement of the frame connecting member 15 on the connecting axis 25 may be stabilized and controlled by a guiding arrangement 37. The guiding members 37 in FIG. 5 comprise a guiding track 38 on each side of the connecting axis housing 33 on the front cross bar 23 and corresponding guiding pins 39 on the frame connecting member 15. When the frame connecting member 15 is rotated on the connecting axis 25, the guiding pins 39 follow the guiding tracks 38. The length of the guiding tracks 38 along the circumference of the connecting axis 25 determines the maximum upwards rotation of the frame connecting member 15 that can be achieved. Preferably, the length of the guiding tracks 38 on the upper part of the housing 33 is adapted to correspond to the position shown in FIG. 6 which is the position where the frame connecting member 15 can be removed from the connecting axis 25.

The invention claimed is:

1. A wheel arrangement on a bicycle trailer, said bicycle trailer comprising a trailer frame and having a longitudinal direction constituting a travelling direction of said bicycle trailer and a transverse direction perpendicular to said longitudinal direction, said wheel arrangement comprising a front wheel pivotably attached to a frame connecting member, characterized in that said trailer frame comprises a connecting axis arranged in said transverse direction of said bicycle trailer and said frame connecting member comprises a connecting hook arranged to engage with said connecting axis, said connecting hook having a width in said transverse direction of said bicycle trailer and being configured to fit on said connecting axis and to receive said connecting axis in an elongated receiving cavity extending in said transverse direction over the full width of said connecting hook and comprising an elongated opening extending in said transverse direction over the full width of said connecting hook and being sized and configured to permit said connecting axis to be inserted into said receiving cavity and to be removed from said receiving cavity through said elongated opening, said connecting hook being arranged to be rotated on said connecting axis between an in-use position, a rest position, and a release position and said wheel arrangement comprising a locking arrangement for locking said front wheel in said in-use position and in said rest position.

2. The wheel arrangement according to claim 1, wherein said width of said connecting hook is greater than a diameter of said connecting axis.

3. The wheel arrangement according to claim 1, wherein said front wheel is folded in under said trailer frame when said connecting hook is rotated into said rest position.

4. The wheel arrangement according to claim 3, wherein said front wheel is held generally horizontally under said trailer frame in said rest position.

5. The wheel arrangement according to claim 1, wherein said connecting axis is arranged in a holder, said holder comprising first and second female locking elements being parts of said locking arrangement and said connecting hook comprising a male locking element arranged to engage with one of said first and second female locking elements when said connecting hook is in said in-use position or in said rest position.

6. The wheel arrangement according to claim 1, wherein said locking arrangement is connected to a manually operated release member.

7. The wheel arrangement according to claim 6, wherein said locking arrangement comprises a spring-loaded male locking element arranged on said connecting hook and said release member comprises a lever acting on a spring mechanism in said spring-loaded male locking element.

8. The wheel arrangement according to claim 1, wherein said wheel arrangement comprises a guiding arrangement comprising a guiding member, said guiding member being arranged to restrict rotation of said frame connecting member on said connecting axis.

9. The wheel arrangement according to claim 8, wherein said guiding member comprise a guiding track arranged in said housing for said connecting axis and a corresponding guiding pin arranged on said frame connecting member.

10. The wheel arrangement according to claim 8, wherein said guiding member defines a maximum upwards rotation of the frame connecting member on the connecting axis, wherein said maximum upwards rotation of said frame connecting member corresponds to said release position.

11. The wheel arrangement according to claim 1, wherein said wheel arrangement comprises means for locking said front wheel on said connecting member in a position perpendicular to said travelling direction of said bicycle trailer.

* * * * *